United States Patent [19]
Bowman et al.

[11] Patent Number: 5,285,009
[45] Date of Patent: Feb. 8, 1994

[54] ELECTRICAL FLOOR BOX

[75] Inventors: Timothy S. Bowman, Parkersburg; J. David Harmon, Vienna, both of W. Va.

[73] Assignee: Butler Manufacturing Company, Kansas City, Mo.

[21] Appl. No.: 722,872

[22] Filed: Jun. 28, 1991

[51] Int. Cl.⁵ .............................................. H02G 3/12
[52] U.S. Cl. .................................................... 174/48
[58] Field of Search ...................... 174/48, 49; 52/221, 52/220.1

[56] References Cited

U.S. PATENT DOCUMENTS

| | | | |
|---|---|---|---|
| 2,886,630 | 5/1959 | Gill | 174/57 |
| 2,996,566 | 8/1961 | Stas | 174/48 |
| 4,010,314 | 3/1977 | Kohaut | 174/48 |
| 4,338,484 | 7/1982 | Littrell | 174/48 |
| 4,536,612 | 8/1985 | Domigan | 174/48 |
| 4,591,656 | 5/1986 | Mohr | 174/48 |
| 4,593,507 | 6/1986 | Hartman | 174/48 X |
| 4,800,237 | 1/1989 | Mohr | 174/48 |

Primary Examiner—Leo P. Picard
Assistant Examiner—David Tone
Attorney, Agent, or Firm—McAndrews, Held & Malloy, Ltd.

[57] ABSTRACT

Two-part floor box disassembled at job site so one part can be connected to conduit without interference from the other part and then the parts reassembled for the pour. Parts are preferably a stamped sheet metal base and a plastic housing which can be slipped into and out of a cavity in base. Radially extending wiring compartments provide for feed thru and for feeding power from outside to the inside of the box structured so any combination of power and communication can be employed.

44 Claims, 4 Drawing Sheets

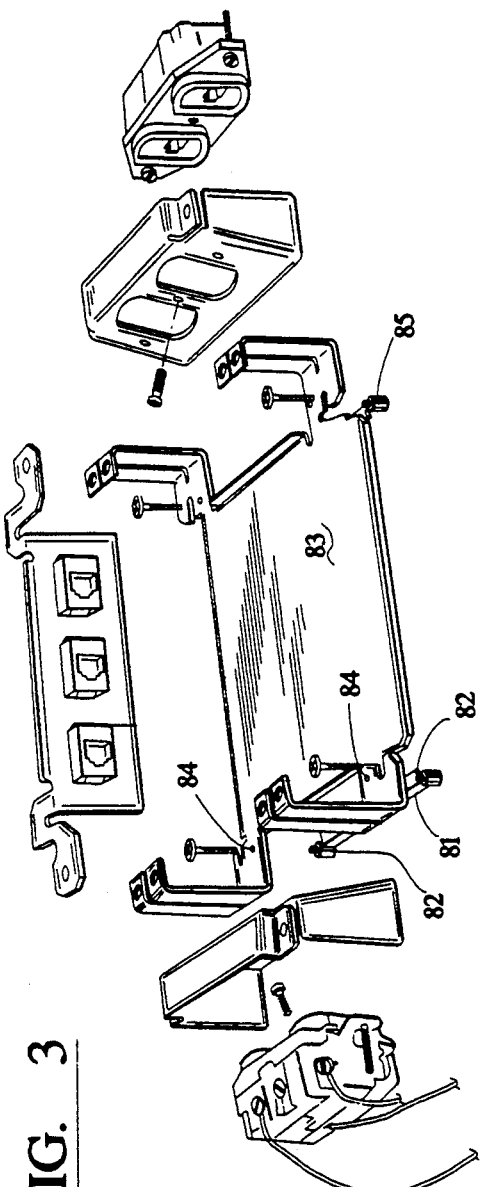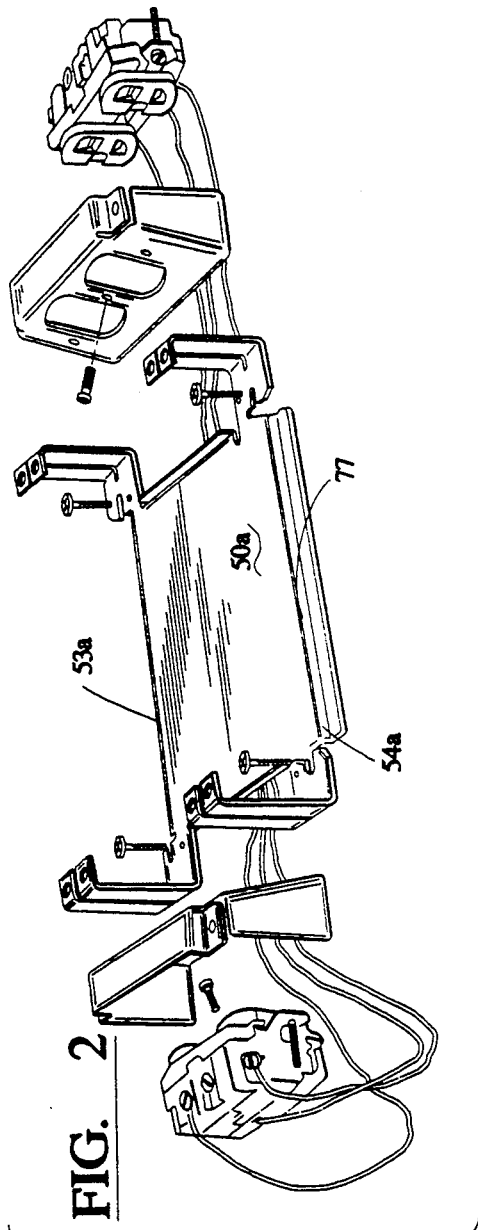
FIG. 3
FIG. 2

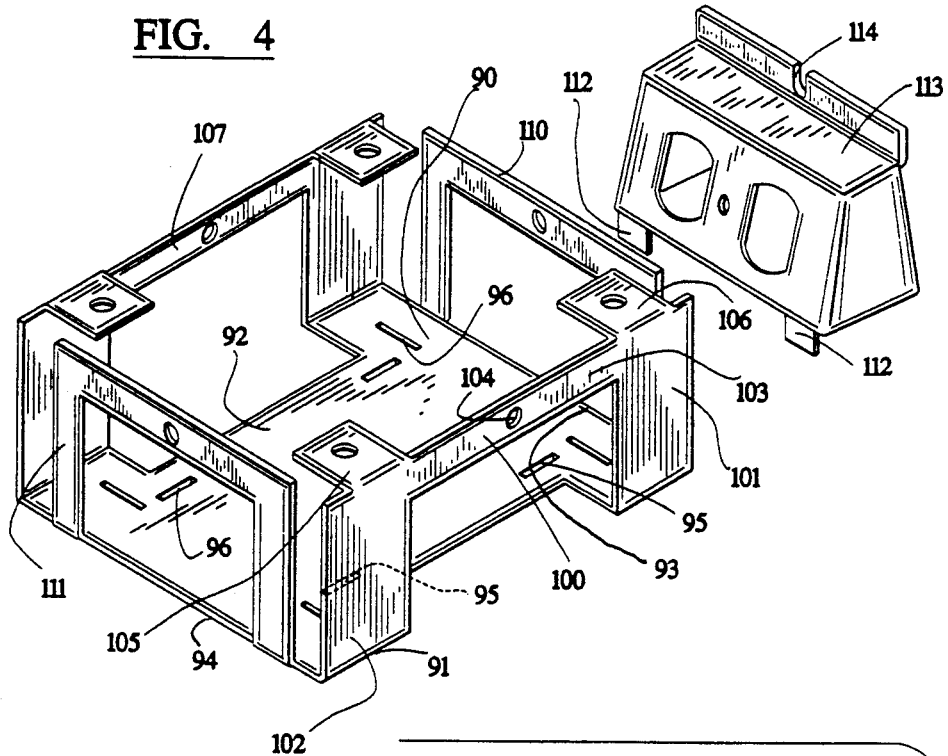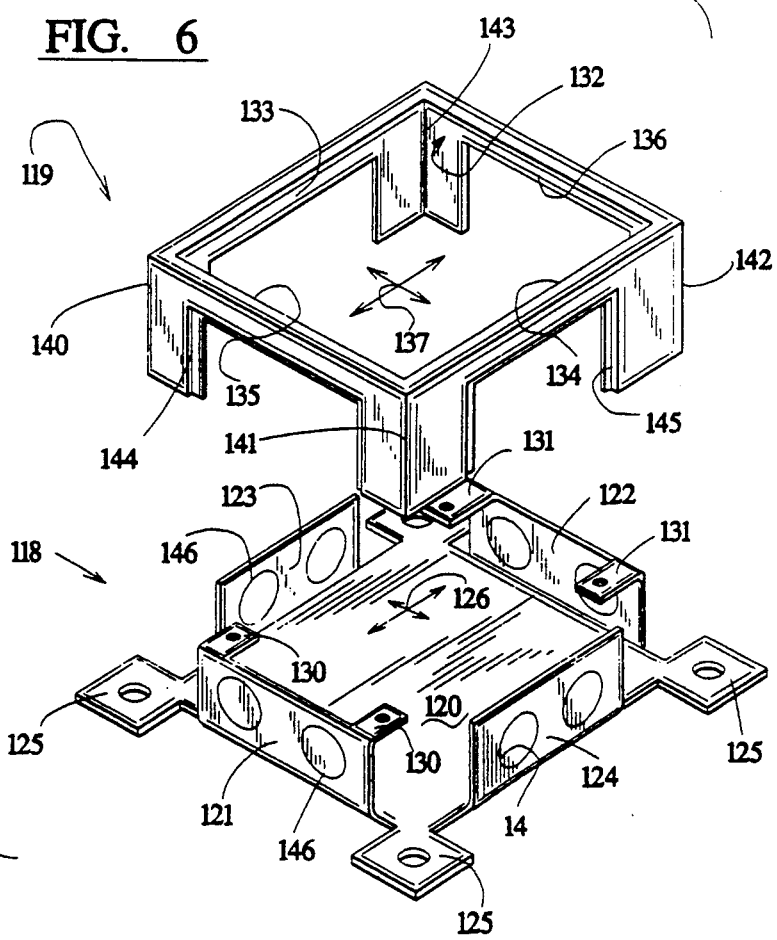

ELECTRICAL FLOOR BOX

This invention relates in general to electrical in-floor power and communication distribution systems for office buildings and the like and in particular relates to a pre-set floor box for use in such systems.

One object of the invention is to provide a floor box structure which greatly increases the versatility of floor boxes with respect to the variety of power and communication service configurations which can be made available and with respect to the feed-through capabilities and geometry.

Another object of the invention is to provide a floor box which is made installer-friendly by the use of structure which permits an assembled two-part box to be brought to the job site and disassembled whereby one part can be quickly connected with conduit (without obstruction from the other part) and installed on the floor.

A further object of the invention is to provide a floor box comprised of a stamped metal base, a molded plastic housing which slides into position on the base (for assembly) and slides out of position (for conduit installation) together with a stamped metal bracket which slides into position in the housing (for assembly) and slides out of position (for installation), the bracket having means to mount an activation kit and provide tunnel or internal wire passageway means.

Another object of the invention is to provide a floor box comprised of closure having a plurality of radially extending wiring compartments adapted to receive conduit so power can be fed from the outside to the inside of the box.

Another object of the invention is to provide a floor box having radially extending wiring compartments each covered by a ribbed structure which helps to increase space in the compartment without sacrificing support strength for concrete topping.

Another object of the invention is to provide an installer-friendly floor box comprised of a two part closure, one part being disengagable at installation so conduit can be connected thereto without interference from the other part, and after such conduit connects for the two parts to be reassembled and condition the box for the pour and for subsequent activation.

The invention will be described below in connection with the following drawings wherein:

FIG. 2 is a perspective view of a bracket employed in the floor box of the invention;

FIG. 3 is an exploded view of a bracket and an alternatively attachable and detachable tunnel barrier employed in the floor box of the invention; and FIG. 4 is a perspective view of a bracket employed in the floor box of the invention;

FIG. 6 is an exploded view of another floor box of the invention.

As used herein the term "power" refers to 110-120 volt distribution in office buildings and the term "communication" refers to voltages used in telephone, computers, data transmission and the like. The term rectangular and square can be considered synonymous. The terms "tunnel" or "raceway passageway" used herein refer to means capable of receiving electrical power or communication conductors and providing for the conductors to extend from one place to another place within the floor box. The tunnel means provide for electrical isolation, for conductor routing and for protection against physical damage.

Figure 1:
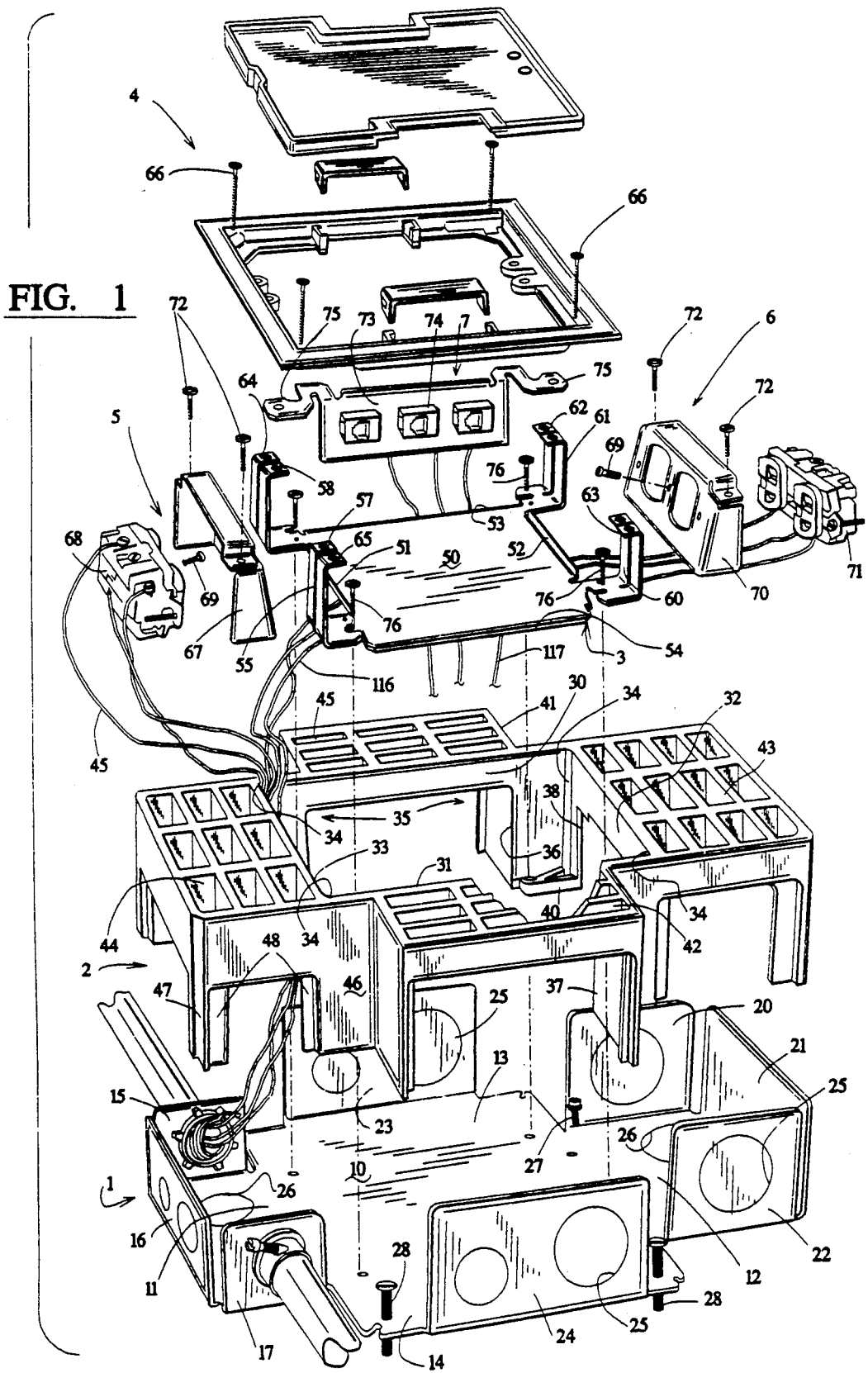
FIG. 1 is an exploded view of a floor box of the invention.

The major components of the floor box are illustrated in FIG. 1. A metal base which is adapted to be mounted on a sub-floor is indicated at 1. A plastic housing arranged to slide in and out of base 1 is indicated at 2. A metal bracket structured to slide in and out of the housing 2 is indicated at 3. The base, the housing and the bracket form a closure means with a hollow interior.

Just above the bracket 3 is a typical activation kit indicated at 4. This particular activation kit is the subject matter of U.S. Pat. No. 4,864,078 owned by the assignee of this invention. It will be understood that other appropriate activation kits may be employed.

Around periphery of the bracket 3 are the oppositely disposed power assemblies 5 and 6 and between the assemblies is a communication assembly 7. Another communication assembly not shown may be located opposite assembly 7.

The components shown in FIG. 1 are adapted to be assembled into a floor box 8 shown in FIG. 5 as will be noted hereinafter. We will now describe each of the individual components starting with the base 1.

The base includes a generally flat rectangular shaped center section 10. First and second generally shaped wiring sections 11 and 12 extend away from the center section 10 respectively on opposite edges thereof Third and fourth generally rectangular wiring section 13 and 14 extend away from the center section respectively on opposite edges thereof.

The wiring section 11 has side walls 15, 16, and 17 which extend upwardly from each of the edge of the section 11. The group of side walls 15, 16, and 17 form part of a wiring compartment as noted later. The wiring section 12 has side walls 20, 21, and 22 which also form part of a wiring compartment as will appear later on.

The wiring section 13 has a single side wall 23 extending upwardly from one edge and the wiring section 14 has a single side wall 24.

Preferably, each of the above side walls is provided with a knock-out each of which is indicated at 25. Likewise the wiring sections 11 and 12 have knockouts 26.

Where required, the base is provided with one or more grounding screws such as the screw 27. Also the base preferably has leveling means such as the screws 28.

The use of a simple, stamped and formed base is conducive to economy and for easy integration with a plastic molded housing as will be appreciated as the description proceeds. The plastic housing 2 will now be described.

The use of a molded plastic housing is desirable both from the stand point of manufacturing and of serving various user needs. The housing permits a great variance in shape which cannot be obtained by stamping and while cast iron boxes may have at least or greater form shaping capabilities, cast iron requires greater, costly secondary manufacturing operations. One type of plastic which may be used for molding the box is PVC.

The housing has a rectangular shaped wall having first and second facing sides 30 and 31 and third and fourth facing sides 32 and 33. The sides are joined respectively to form corners indicated at 34. The four sides create a center opening 35. The sides 30, 31, 32 and 33 respectively have openings 36, 37, and 38, with the opening in side 33 not shown.

On each one of the corners 34 is formed a foot, one of these feet being indicated at 40. Each one of the feet is formed with a clearance aperture to receive an attachment screw. The height of the foot is sufficient to independently hold the attachment screw generally vertically so as to assist the assembler in inserting the screw in the threaded hole in the base and tightening the same.

The housing includes covers 41, 42, 43, and 44 which, as will be more apparent later, each form part of a wiring compartment. The covers extend generally horizontally and are respectively connected with the top of and extend outwardly respectively from the sides 30, 31, 32, and 33 each cover is formed with a bottom wall (not shown) and a plurally vertically extending rib walls such as the rib wall 45 for cover 41. The covers are buried in the concrete and the rib structure keeps the covers from deflecting to thereby avoid concrete cracking.

Each of the covers has leg means which extend downwardly and are provided with sockets to receive the various side walls on the wiring sections. For example, the cover 44 has legs 46 and 47 which form the socket 48 for receiving side wall 17.

The bracket 3 will next be described.

The bracket has a rectangular shaped conductor blocking plate 50 having first and second oppositely disposed edges 51, and 52 and third and fourth oppositely disposed edges 53 and 54. Adjacent the first edge 51 is a pair of upwardly extending inboard fingers and 56 each of which terminates in a right angle bend (57, 58) having an aperture for receiving a holdown screw. The edge 52 has similar inboard fingers 60 and 61.

As noted later, the inboard fingers 55, 56, and 60, 61 are for supporting power and communication plates.

Adjacent each corner of the conductor blocking plate and the above mentioned inboard fingers are outboard fingers having the same structure. The outboard fingers are noted at 62, 63, 64, and 65 and are for use in receiving activation kit attachment screws such as screws 66.

The power assembly 5 comprises the receptacle plate 67 and duplex receptacle 68 adapted to be secure thereto by screw 69. The receptacle plate 67 fits over the inboard fingers 55 and 56 and is supported on the right angle bends 57, 58. The power assembly 6 comprises the receptacle plate 70 and receptacle 71. The receptacle plates 70 and receptacle 71 are mounted on the inboard fingers 60 and 61. The receptacle plates 67 and 70 are secured by attachment screws 72.

The conductor blocking plate 50 is dimensioned so that when the receptacle plates are in position the plate 50 extends under and engages the bottom edges of the plates.

The communication assembly 7 includes the support bracket 73 carrying snap-on jacks 74. The assembly is mounted on the bracket 3 by the ears 75 engaging the tops of the receptacle plates 67 and 70. The screws 72 hold ears 75 in place.

The conductor blocking plate 50 is dimensioned so that when the communication assembly is in position, the plate 50 may extend underneath the bottom edge of the support 73.

The base 1, housing 2, and the bracket 3 are dimensioned for sliding engagement. Thus, the housing is pressed down into the base so that the side walls fit into the sockets such as the side wall 17 fitting into socket 48.

When the base and housing are fitted together, the side walls of the base, the covers, and downwardly extending legs create wiring compartments over the wiring sections 11, 12, 13, and 14. In FIG. 5 these wiring compartments are designated as W-1, W-2, W3, and W-4. The wiring compartments receive conductors and receptacles or jacks. As will be noted, the wiring compartments extend radially outwardly from the closure means. The horizontal orientation of the covers and ribbed structure is conducive to increasing the interior space in a wiring compartment without the danger of deflection causing cracking of the concrete.

When the bracket 3 is pushed down into the housing 2 the conductor blocking plate 50 engages the feet 40 and is held in position by screws 76. The threaded portion of each screw 76 passes through a clearance hole in the conductor blocking plate 50, fits down into the clearance hole in the feet 41 and is threaded into a hole in the center section 10 of the base.

From the foregoing, it will be noted that no separate wires or screws are needed for grounding. The screws 66, 72, 76 used for attaching purposes also serve to electrically connect different metal parts and establish a ground. This saves material and labor costs and is especially important where the activation kit is metallic.

The engagement of the plate 50 with the feet 40 spaces the plate 50 above the base center section 10. This creates a tunnel open to each of the wiring compartments to provide a passageway for conductors to extend between compartments.

The conductor blocking plate prevents a conductor in the tunnel from moving up into the interior of the box and also prevents the conductors in the tunnel being contacted by some object in the interior.

In the embodiment of FIG. 1, the conductors in the tunnel pass as between the power wiring compartments into the wiring sections 11 and 12 and are essentially isolated from the communication compartments over the wiring sections 13 and 14 particulary because of the extension of the edges 53 and 54 into the compartments and fact that the jacks 74 are carried by the support 73 substantially above the blocking plate 50.

Isolation of the communication wiring compartments can also be accomplished by the use of tunnel barriers One arrangement for this is shown in FIG. 2 wherein the conductor blocking plate 50a (corresponding to plate 50) has edges 53a and 54a (corresponding to edges 53 and 54) including integral, downwardly extending barrier flange such as the flange 77 for edge 54a. The barrier flanges prevent lateral movement of conductors in the tunnel into the communication wiring compartments.

In some instances, such as for example where power circuits are dedicated it is desirable that the power wiring compartments be isolated from the tunnel. The invention contemplates means to readily convert the box for such purposes. This takes the form of tunnel barriers of the type that can be alternatively attached to and detached from the blocking plate. Such an arrangement is shown in FIG. 3.

An elongated member 81 molded from plastic has a pair of projections 82. The conductor blocking plate 83 has a pair of receiving apertures 84. The projections 82 can be pushed up into the receiving apertures 84 and the member 81 will remain in place until it is removed by pulling the same away from the plate 83. The elongated member or tunnel barrier 81 has a height which is the same as the height of the tunnel.

As will be observed, the tunnel barrier 81 isolates the tunnel and the wiring compartment.

A similar tunnel barrier 85 with the same means for attaching and detaching is employed on the opposite side.

From the foregoing description, it will be apparent that the barriers provide a means for internal routing for conductors.

The arrangements described in connection with FIG. 1-3 are each for power and communication applications. In cases where all power is desired a special bracket for this purpose is preferably employed. Such a bracket is shown is FIG. 4.

A rectangular shaped conductor blocking plate 90 has first and second oppositely disposed edges 91 and 92 and third and fourth oppositely disposed edges 93 and 94.

Respectively adjacent the first and second edges 91 and 92 are pair of slots 95 and 96. Similar slots not shown are provided adjacent the edges 93 and 94.

Extending upwardly from the first edge 91 is a U-shaped member 100. The member 100 comprises a pair of fingers 101 and 102 and connecting bridge 103. The bridge 103 has a receiving aperture 104. At the top of each finger is a small aperture support flange. These support flanges are indicted at 105 and 106 and are adapted to mount the activation kit employed with the box.

Adjacent the edge 92 is a U-shaped member 107 which has the same structure as member 100. Adjacent the edges 93 and 94 are U-shaped member 110 and 111 each of which except for the omission of support flanges has a structure as described for member 100.

The slots 95 etc. are for receiving tangs of a receptacle plate such as the tangs 112 of plate 113. The plate has a receiving slot 114 which receives a screw threaded into the aperture in the bridge.

While the special bracket 90 is preferred for all-power purposes, it will be understood that the box of FIG. 1-3 is convertible to all-power by eliminating the communication support brackets and substituting power receptacle plates.

Figure 5:
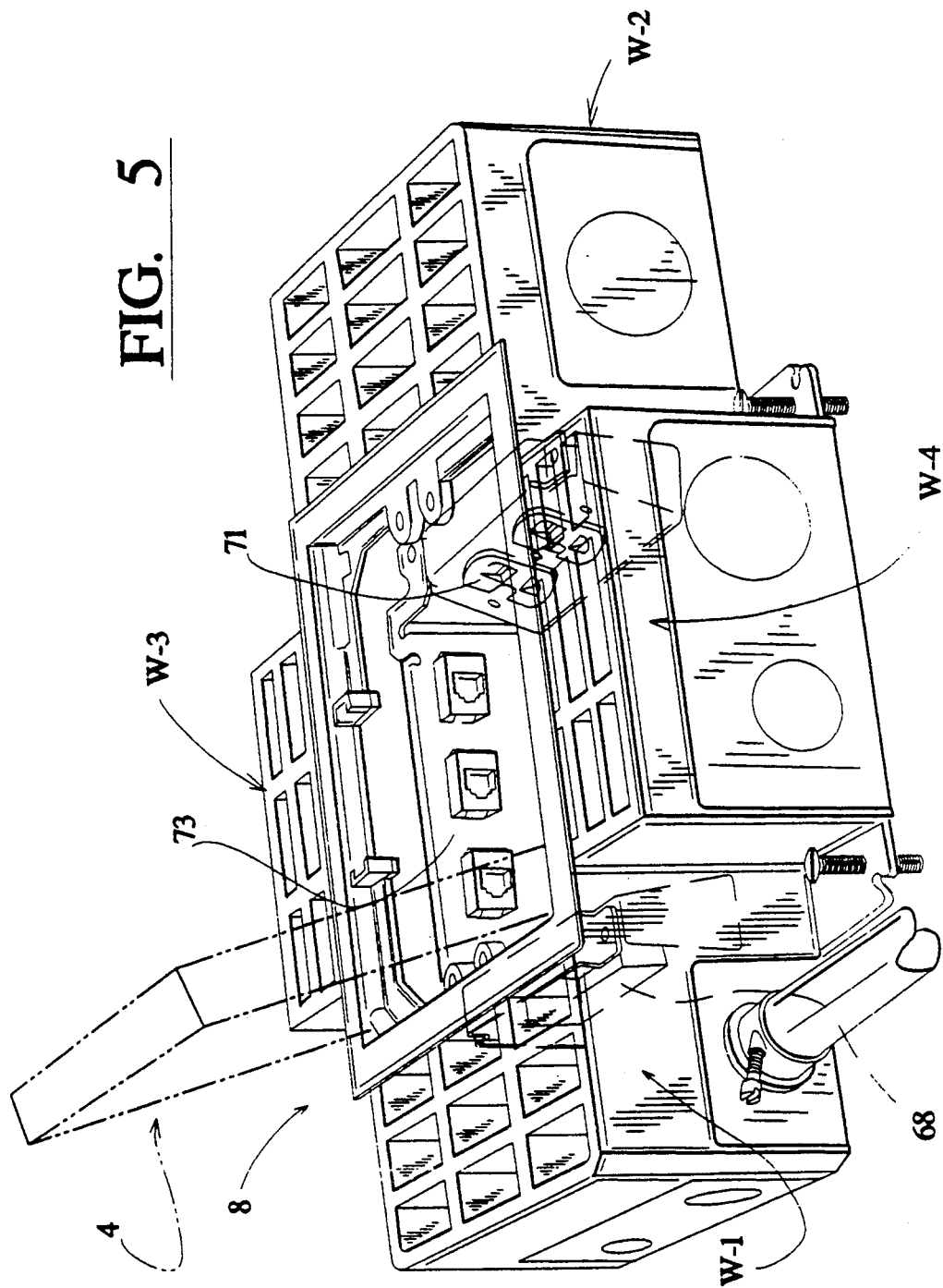
FIG. 5 is a perspective view of an assembled floor box of the invention.

When assembled the floor box appears as shown in FIG. 5. Corresponding components have the same numerals as used heretofore.

We will now briefly comment on the preferred installation procedure particularly as to the embodiment of FIG. 1.

First, the base, housing, and bracket are separated. The appropriate knockouts are removed and conduit is attached. Accomplishing this with the floor box of the invention is very easy since the housing (being removed) offers no interference.

The housing 2 is slipped into the base. The bracket 3 is now slipped into place and fastened down to hold the housing on the base. The assembly is leveled with respect to the screed line. The box is secured to the floor as by nails inserted next to the leveling screws or by wire.

An appropriate concrete cover or mud cap is then positioned in the top or access opening 35, and the box is ready for the pour.

For wiring the box after the pour, the mud cap is removed the housing slipped out of the base, the appropriate conductors are brought out through the housing and connected to the power receptacles and/or the communication plates and then fastened down on the bracket 3. The activation kit can now be installed. In connection with wiring note that the conductors for the receptacles 68 and 71 are indicated at 115 and 116 in FIG. 1. They pass through the wiring compartments above the wiring section 11. The conductors for the jacks 74 are indicated at 117. They pass up through the wiring compartment over wiring section 13.

From the foregoing description it will be apparent that the tunnel means and the tunnel barrier provide for various and selective conductor routing as between wiring compartments while retaining electrical isolation. Also, the radially extending wiring compartments provide for box entry and/or feed-thru from the same conduit line. The wiring compartments on the opposite sides of the box provide for complete isolation of circuits which is particulary useful for dedicated circuits.

The advantage of the tunnel means will be observed in FIG. 1 where it will be seen that conductors 115 and 116 from the conduit are respectively connected to receptacle 68 and 71 with the conductors 116 being fed to the receptacle 71 via the tunnel.

The invention contemplates the installer-friendly floor structure for those floor boxes where wiring compartments are not required. We have illustrated such a floor box in FIG. 6.

The closure or housing has a base 118 and a housing 119. Preferably, these are respectively metal and plastic.

The base 118 includes a generally flat rectangular shaped center section 120. Side walls 121, 122, 123, and 124 which extend upwardly from the respective edges of the center section 120 Adjusting screw tabs each of which is noted at 125 extend outwardly from the respective four corners of the center section 120. The tabs have threaded holes to receive adjusting or leveling screws. Like the box of FIG. 1, the side walls 121-124 form a cavity 126. Side wall 121 is provided with tabs 130 while side wall 122 has similar tabs 131. The tabs have threaded apertures to receive attaching screws.

The housing 119 has a rectangular shaped inner wall 132 comprising facing sides 133, 134 and facing sides 135, 136. The facing sides create central access opening 137. At each corner of the housing there are downwardly extending leg means 140, 141, 142, 143, which are configured to form sockets two of which are indicated at 144 and 145.

The sockets are adapted to receive the side walls 121-124. The sockets and side walls make a snug but sliding fit. This provides for the base and housing to be pushed together and separated without difficulty. When the housing and base are assembled or pushed together, the tabs 130 and 131 extend into the hollow interior. For shipping purposes, a mud cap is press fitted into the opening 137 and rests on tabs 130 and 131. For activation purposes the tabs support an activation kit and the threaded holes in the tabs receive attaching screws to hold the activation kit in position.

As indicated the side walls 121-124 are provided with knock-outs 146. When a knockout is removed a conduit can be secured to a side wall.

For installation on the floor, the base and housing are separated and the base joined to conduits. The housing and base are then reunited, and the box leveled for the pour.

We claim:

1. An installer-friendly floor box comprising:
    a metal base having a bottom and a plurality of side wall sections extending upwardly therefrom and forming a cavity;

a plastic housing configured to slide in and out of said cavity, the housing having a hollow interior and means cooperating with said side wall sections to form a plurality of wiring compartments each open to the hollow interior and the housing, when in said cavity, engaging said base;

a metal bracket configured to slide into out of said hollow interior and when in the hollow interior engaging the plastic housing for securing the plastic housing to said base, the bracket being formed with conductor blocking means which, when the bracket is in the hollow interior, is spaced from the bottom and extends adjacent each of said wiring compartments, the bottom and the conductor blocking means forming tunnel means for passage of electrical conductors between at least a pair of said wiring compartments;

said metal bracket having means to support an activation kit to extend over said hollow interior; and the floor box being installer friendly by that said bracket and said housing can be completely removed from said base to provide for the base to be independently installed and for electrical conduit to be freely connected thereto and for electrical high tension receptacles and low tension jacks, when used, to be easily wired in place.

2. The floor box of claim 1 further including a plurality of tunnel barriers, each tunnel barrier having means providing for the member to be alternatively attached or detached from the underside of said conductor blocking means and each tunnel barrier, when attached, preventing an electrical conductor from extending into or out of a wiring compartment.

3. The floor box of claim 1 further including screw means engaging said metal base and said metal bracket and functioning to hold the housing on the base and to provide an electrical ground between the base and the bracket.

4. An electrical floor box comprising:

closure means formed with a hollow interior and with a top opening providing access to the interior;

means connected with said closure means forming a pair of wiring compartments disposed opposite one another; and conductor blocking means having first and second opposite edges and being disposed in said hollow interior, said conductor blocking means and said first and second opposite edges extending between and interconnecting said wiring compartments so as to provide a tunnel means for passage of electrical conductors between said wiring compartments;

the conductor blocking means functioning to prevent an electrical conductor which extends in said tunnel means from moving in a vertical direction and entering the hollow interior above the conductor blocking means; and first and second downwardly extending tunnel barriers disposed along said first and second opposite edges and functioning to prevent an electrical conductor in said tunnel means from moving in a lateral direction and entering said hollow interior.

5. The floor box of claim 4:

wherein said tunnel barriers are formed by first and second elongated members detachably secured to said conductor blocking means.

6. The floor box of claim 5:

wherein said conductor blocking means has a first pair of spaced apart receiving apertures disposed adjacent said first edge and a second pair of spaced apart receiving apertures disposed adjacent said second edge; and wherein said first and second elongated members each have a pair of spaced apart projections to be received respectively in said receiving apertures, said receiving apertures and said projections providing for each elongated member to be removed and replaced.

7. The floor box of claim 4, wherein the closure means comprises a base having a bottom and a plurality of side walls extending upwardly therefrom and a housing connectable with the side wall to form the wiring compartments and a hollow interior, and wherein the conductor blocking means is configured to slide into and out of the hollow interior through the top opening.

8. The floor box of claim 7, wherein the base is formed of metal, the housing is formed of plastic, and the conductor blocking means is formed of metal.

9. The floor box of claim 8 wherein the housing is slidably connectable with the side walls of the base.

10. The floor box of claim 9 wherein the conductor blocking means includes a bracket adapted to support an activation kit above the hollow interior.

11. The floor box of claim 10, including means operable when said activation kit is made of metal to form a grounding circuit between the activation kit and the base.

12. The floor box of claim 10 further including means to secure the activation kit to the housing and to secure the housing to the base and to electrically ground the activation kit to the base when the activation kit is made of metal.

13. The floor box of claim 7, wherein at least one of the side walls has a knock-out.

14. The floor box of claim 7, wherein the bottom of the base includes at least one knock-out.

15. The floor box of claim 7, wherein the wiring compartments are adapted to receive power assemblies and communication assemblies.

16. The floor box of claim 15, wherein the power assemblies and communication assemblies can be fixedly mounted on the blocking means so as to be received by the wiring compartments.

17. An electrical floor box comprising:

closure means formed with a hollow interior and with a top opening providing access to the interior;

means connected with said closure means forming a first and second wiring compartments including respectively first and second receptacle plate means, the first and second wiring compartments being disposed opposite one another with the first and second receptacle plate means in facing relationship;

means connected with said closure means forming third and fourth wiring compartments respectively including third and fourth receptacle plate means, the second and third wiring compartments being disposed opposite one another with the third and fourth receptacle plate means in facing relationship;

conductor blocking means in said hollow interior and extending between and interconnected respectively with said first and second receptacle plate means and also with said second and third receptacle plate means and providing tunnel means for passage of an electrical conductor in one wiring compartment to extend to any one of said other wiring compartments;

the conductor blocking means functioning to prevent an electrical conductor which is in said tunnel means from moving in a vertical direction and entering the hollow interior above the conductor blocking means and to prevent last said electrical conductor from being engaged by an object in the hollow interior; and a pair of alternatively usable elongated members, each elongated member having means for attaching or detaching the member to said conductor blocking means, the pair of members when attached to said conductor blocking means each respectively functioning to prevent an electrical conductor in said tunnel means from entering a wiring compartment.

18. An electrical floor box comprising:

closure means formed with a hollow interior and with a top opening providing access to the interior;

means connected with said closure means forming a first and second wiring compartments including respectively first and second receptacle plate means for holding a high-tension receptacle, the first and second wiring compartments being disposed opposite one another with the first and second receptacle plate means in facing relationship;

means connected with said closure means forming third and fourth wiring compartments respectively including first and second low tension supports, each for holding a low tension jack and the third and fourth wiring compartments being disposed opposite one another with the first and second low tension supports in facing relationship;

conductor blocking means in said hollow interior and extending between and interconnected respectively with said first and second receptacle plate means and also with said first and second low tension supports and providing tunnel means for passage of an electrical conductor in one wiring compartment to extend to any one of said other wiring compartments; and the conductor blocking means functioning to prevent an electrical conductor which is in said tunnel means from moving in a vertical direction and entering the hollow interior.

19. The floor box of claim 18 further including:

a pair of elongated members, each elongated member having means providing for the member to be alternatively attached to or detached from said conductor blocking means the pair of members when attached to said conductor blocking means and each member respectively functioning to prevent an electrical conductor in said tunnel means from entering a power wiring compartment.

20. For an electrical floor box, a metal base member comprising:

a generally flat bottom having a center section, first and second rectangular shaped wiring sections extending away from the center section respectively from opposite edges of the center section, third and fourth rectangular shaped wiring sections extending away from the center section respectively from opposite edges of the center section;

on each said first and second wiring section, side walls extending outwardly respectively from each edge thereof, the first and second wiring sections and the side walls thereof adapted to form part of a wiring compartment for the electrical floor box with which the base is used; and on each of said third and fourth wiring sections, a side wall extending outwardly from an edge thereof, each of last said wiring sections and its side wall adapted to form part of a wiring compartment for the electrical floor box with which the base is used.

21. The base of claim 20 wherein some of said side walls have knock-outs.

22. The base of claim 20 wherein some of said power sections have knock-outs and some of said side walls have knock-outs.

23. The base of claim 20 wherein said base has at least one knock-out.

24. For an electrical floor box, a housing molded of plastic material comprising:

a rectangle shaped wall having first and second sides facing one another and having third and fourth sides facing one another, the first and second sides and the third and fourth sides being respectively joined to form four corners and the four sides forming a center opening;

opening means formed in said first and second sides and opening means formed in said third and fourth sides;

first and second covers respectively connected with the tops of and extending outwardly of said first and second sides;

third and fourth covers respectively connected with the tops of and extending outwardly of said third and fourth sides;

on each one of said covers, leg means extending downwardly therefrom and each formed with socket means for respectively receiving sides of a base with which the housing is used; and at each one of said corners, a foot projecting into said opening to receive bracket means used with the housing.

25. The housing of claim 24 wherein each said cover is formed by a bottom wall and plurality of interconnected rib walls extending upwardly therefrom.

26. For an electrical floor box, a metal bracket comprising:

a rectangular shaped conductor blocking plate having first and second oppositely disposed edges and third and fourth oppositely disposed edges;

respectively adjacent said first edge and said second edge, a pair of slots for receiving the tangs of a receptacle plate;

respectively on said first edge and on said second edge, a U-shaped member comprising a pair of fingers extending upwardly from one side of said conductor blocking plate and a bridge from one side of said conductor blocking plate and a bridge connected between the extremities of the fingers; each bridge having an aperture for receiving a screw to hold a receptacle plate;

respectively adjacent said third edge and said fourth edge, a pair of slots for receiving the tangs of a receptacle plate;

respectively on said third edge and on said fourth edge, a U-shaped member comprising a pair of fingers extending upwardly form one side of said conductor blocking plate and a bridge connected between the extremities of the fingers; each bridge having an aperture for receiving a screw to hold an electrical plate; and respectively on each one of last said fingers, a support flange having an aperture for receiving the hold-down screw of an activation kit to be used with the floor box.

27. For an electrical floor box a metal bracket comprising:
a rectangular shaped conductor blocking plate having first and second oppositely disposed edges and third and fourth of oppositely disposed edges;
adjacent each corner of said conductor blocking plate, means extending upwardly therefrom for receiving and having an aperture for receiving the attaching screw of a floor fitting to be used with the floor box;
adjacent said first edge, means extending upwardly from one side of said conductor blocking plate for receiving and securing a receptacle plate;
adjacent said second edge, means extending upwardly from said one said of said conductor blocking plate for receiving and securing an electrical plate; and
adjacent said third edge a tunnel barrier in the form of a flange extending downwardly from the opposite side of said conductor plate; and
adjacent said fourth edge a tunnel barrier in the form of a flange extending downwardly from the opposite side of said conductor plate.

28. An electrical floor box comprising:
closure means having a hollow interior and a plurality of radially, outwardly extending wiring compartments, each wiring compartment being in communication with the hollow interior; and
for each said wiring compartment, a cover comprised of a bottom wall and a plurality of inter-connected rib walls extending upwardly therefrom.

29. An electrical floor box comprising:
closure means having a hollow interior and a plurality of radially outwardly extending wiring compartments, each wiring compartment being in communication with the hollow interior;
at least some of said wiring compartments having mechanism to connect raceway means thereto and provide for passage of electrical conductors in the raceway means into last said respective wiring compartments for purposes of feeding electrical energy from the outside of the box to the inside of the box and also provide for passage of electrical conductors in the raceway means into, thru, and out of last said respective wiring compartments for purposes of feedthru.

30. An electrical floor box comprising:
closure means formed by a base and a housing, the base having a cavity and the housing being configured to slide into and out of the cavity and the housing having a hollow interior;
said closure means formed with a plurality of outwardly extending wiring compartments, each wiring compartment being in communication with said hollow interior; and
at least some of said wiring compartments having mechanism to connect raceway means thereto and provide for passage of electrical conductors in the raceway means into last said respective wiring compartments for feeding electrical energy from the outside of the box to the inside of the box.

31. The electrical floor box of claim 30 further including:
tunnel means on said base to provide for passage of electrical conductors as between at least some of said wiring compartments.

32. The electrical floor box of claim 30 further including:
tunnel means on said base to provide for selective interior routing of electrical conductors as between at least some of said wiring compartments.

33. The electrical box of claim 30 wherein:
each said wiring compartment is formed with a cover and each cover comprising a bottom wall and a plurality of interconnected ribs extending upwardly therefrom.

34. An apparatus comprising:
a floor box having a bottom, a hollow interior above the bottom, and four wiring compartments disposed around and being open to the hollow interior;
a blocking plate removably disposed in the hollow interior and being supported a predetermined distance above the wiring box bottom so as to form a tunnel between the bottom and the blocking plate, the tunnel providing for passage of electrical conductors between at least some o the wiring compartments and the blocking plate being adapted to limit movement of electrical conductors contained in the tunnel;
tunnel barriers extending between the blocking plate and the bottom of the wiring box, the tunnel barriers being adapted to restrict lateral movement of electrical conductor contained in the tunnel.

35. The apparatus of claim 34, further including connector means for selectively attaching or detaching the tunnel barriers to the blocking plate.

36. The apparatus of claim 35, wherein the tunnel barriers can be positioned to selectively route electrical conductors between the wiring compartments.

37. The apparatus of claim 36, wherein each tunnel barrier includes at least two projections, the blocking plate includes apertures adapted to receive the projections.

38. The apparatus of claim 37, wherein the tunnel barriers are in the form of flanges integrally formed with the conductor blocking plate.

39. The apparatus of claim 38, wherein the floor box includes a base having a bottom and a plurality of side walls extending upwardly therefrom and a housing connectable with the side wall to form the wiring compartments and a hollow interior.

40. The apparatus of claim 39, wherein at least one of the side walls has a knock-out.

41. The apparatus of claim 39, wherein the base is formed of metal, the housing is formed of plastic and the conductor blocking plate is formed of a metal.

42. The apparatus of claim 41, wherein the housing is slidably connectable with the side walls of the base.

43. The apparatus of claim 34, wherein the wiring compartments are adapted to receive power assemblies and communication assemblies.

44. The apparatus of claim 43, wherein the power assemblies and communication assemblies can be fixedly mounted on the blocking plate so as to be received by the wiring compartments.

* * * * *

UNITED STATES PATENT AND TRADEMARK OFFICE
CERTIFICATE OF CORRECTION

PATENT NO. : 5,285,009

DATED : February 8, 1994

INVENTOR(S) : Timothy S. Bowman and J. David Harmon

It is certified that error appears in the above-identified patent and that said Letters Patent is hereby corrected as shown below:

Column 3, line 48, change "plates" to --plate--.
Column 12, line 23, change "wiring box" to --floor box--.
Column 12, line 31, change "wiring box" to --floor box--.

Signed and Sealed this

Eighteenth Day of October, 1994

Attest:

BRUCE LEHMAN

Attesting Officer    Commissioner of Patents and Trademarks